United States Patent
Mesu et al.

(10) Patent No.: US 7,169,422 B2
(45) Date of Patent: Jan. 30, 2007

(54) MANUFACTURE OF GRANOLA AND SNACK-FOOD PRODUCTS

(75) Inventors: Gurbe Jelle Mesu, Zaltbommel (NL); Jacobus Boot, Schiedam (NL)

(73) Assignee: The Quaker Oats Company, Chicago, IL (US)

(*) Notice: Subject to any disclaimer, the term of this patent is extended or adjusted under 35 U.S.C. 154(b) by 168 days.

(21) Appl. No.: 10/044,256

(22) Filed: Jan. 11, 2002

(65) Prior Publication Data

US 2002/0090438 A1 Jul. 11, 2002

Related U.S. Application Data

(63) Continuation of application No. 09/487,137, filed on Jan. 19, 2000, now abandoned.

(30) Foreign Application Priority Data

Jan. 19, 1999 (GB) ................................. 9901153.8

(51) Int. Cl.
A23L 1/10 (2006.01)
A23L 1/182 (2006.01)
A23L 1/36 (2006.01)

(52) U.S. Cl. ...................... 426/285; 426/453; 426/618; 426/629; 426/639

(58) Field of Classification Search .................. 426/89, 426/93, 272, 302, 307, 309, 618, 629, 639, 426/658, 285, 453
See application file for complete search history.

(56) References Cited

U.S. PATENT DOCUMENTS

| | | | | |
|---|---|---|---|---|
| 4,451,488 A | * | 5/1984 | Cook et al. | 426/89 |
| 4,605,561 A | * | 8/1986 | Lang | 426/93 |
| 4,784,867 A | | 11/1988 | LaBaw et al. | 426/309 |
| 5,275,830 A | * | 1/1994 | Smith | 426/93 |
| 5,413,805 A | * | 5/1995 | Delpierre, III et al. | 426/620 |

OTHER PUBLICATIONS

*Forming of Coated and Uncoated Cereal Bar*, Author: Gerhard Ridderbusch, General Manager, Sollich GmbH & Co., K.G., Date: Dec. 1985, Publication: *Confectionery Production*.

* cited by examiner

*Primary Examiner*—Arthur L. Corbin
(74) *Attorney, Agent, or Firm*—Banner & Witcoff, Ltd.

(57) ABSTRACT

A method for making a granola or snack-food product comprises (a) mixing ingredients for said granola or snack-food product with liquid binder to obtain a formable mixture, wherein the mixing is carried out at elevated temperature and the binder is liquid at elevated temperature and the binder sets when cooled to room temperature; (b) forming the mixture into product precursor, wherein the forming is carried out at elevated temperature and whilst the binder is still liquid; and (c) cooling the precursor to set the binder, thereby obtaining the snack-food product. Apparatus for making the product is also described as is the product obtained thereby.

10 Claims, No Drawings

MANUFACTURE OF GRANOLA AND SNACK-FOOD PRODUCTS

This application is a continuation of application application Ser. No. 09/487,137 filed on Jan. 19, 2000 now abandoned which claims priority of United Kingdom application number 9901153.8 filed on Jan. 19, 1999.

The present invention relates to manufacture of granola and snack-food products, and in particular to manufacture of hand-held snack-food products such as granola bars made up typically of nuts, dried fruit and/or cereal products in a binder.

In a known method of making snack-food products, such as granola bars, the two basic ingredients are a binder which is typically a sugar solution and dried components such as nuts, dried fruit and cereal products. These ingredients are thoroughly mixed and then formed into large sheets which are transferred into a drying oven. Whilst passing through or in the drying oven, moisture is removed from the sugar solution binder and also from the components of the snack-food product, resulting in a sheet of dried, adhered components which can then be removed from the oven and cut into the desired sizes and shapes of the snack-food product. Such a method is described in U.S. Pat. No. 4,451,488, the content of which is incorporated herein by reference.

In the known method, the step of breaking or cutting the sheet of dried, adhered components into the desired sizes and shapes can result in waste of material, such as small bits of nuts or fruit that break-off before packaging of the snack-food products. A sieving step is required to remove these small bits from the finished product.

The step of drying the sheet in the drying oven is particularly time-consuming and typically is the rate-limiting step in the process that holds up the whole of the rest of the production line. It would be desirable to reduce this drying step or to carry it out under such conditions that production were not limited by the capacity of the drying oven.

It is therefore an object of the present invention to provide a method of making a granola or snack-food product in which the drying time required to make the product is reduced. A further object of the present invention is to provide a method of making a granola or snack-food product in which there is reduced wastage of material in forming the end product. It is a still further object of the present invention generally to increase the production efficiency of making such products.

In accordance with the invention, a method of making a granola or snack-food product comprises:

at elevated temperature, mixing ingredients for the granola or snack-food product with liquid binder to obtain a formable mixture, wherein the binder is liquid at said elevated temperature and sets when cooled to room temperature;

at elevated temperature, whilst the binder is still liquid, forming the mixture into a product precursor; and cooling the product precursor to set the binder, thereby obtaining the granola or snack-food product.

Thus, the binder is in a liquid state at the elevated temperature used for mixing of the product ingredients and sets when cooled, binding the ingredients for the product and setting to a relatively non-sticky and dry state suitable for the desired end product without further drying or processing steps. It is hence an advantage of the invention that the drying steps seen in the prior art methods are largely or wholly removed from the process of the present invention. The ingredient are typically selected from the group consisting of fruit, dried fruit, cereal products, cereal flakes, and mixtures thereof, and preferably selected from the group consisting of oat flakes, wheat flakes, hazelnuts, coconut, crisp rice and mixtures thereof. The weight ratio of binder: ingredients is generally about 25–45:75–55.

By elevated temperature it is intended to mean a temperature at which the binder is in a liquid state and is sufficiently liquid for snack-food product ingredients to be mixed with the binder by conventional mixing equipment. The elevated temperature is preferably at least about 60° C., more preferably at least about 80° C. and even more preferably at least about 90° C. Generally, the binder and the ingredients are at substantially the same temperature during mixing, so that the binder remains liquid during mixing and does not set until the product precursor has been formed and then cooled.

The forming step optionally includes moulding or cutting or breaking or otherwise forming the mixture into a product precursor whilst at elevated temperature. Thus, the method may typically include cutting the heated mixture before it is cooled to set the binder. An advantage is that cutting the mixture whilst at elevated temperature tends to result in a sharper and more precise cut without the risk of breaking or fragmenting of the mixture, which tends to happen to a significant degree when a cooled product is cut as in the prior art.

In embodiments of the invention the binder is a sugar solution which is liquid at elevated temperature and which is set when cooled to below about 40 degrees C. Room temperature is generally considerably below about 40 degrees C. and thus the binder advantageously sets so that in use binder will not risk melting in the hand of the consumer or in storage or in transit.

Sugar-containing solutions are particularly suitable to form binders according to the invention. They can easily and inexpensively be prepared with entirely edible contents. They have a sweetness appropriate for a sweet or confectionery snack and are in wide use in this field. The sugar solutions used in preferred embodiments of the invention are characterised in that they have the properties set out above, namely that of being liquid at, or capable of being made liquid by heating to, elevated temperatures and setting when cooled to room temperature.

The properties of the binder are related to the concentration of sugar or sugars therein, and generally these are such that the higher the solids content of the binder, the higher its boiling temperature and the higher its setting temperature. Whatever concentration is adopted, the binder must be sufficiently liquid under the chosen processing conditions for the mixture to be formed into the desired shape of product precursor. Preferably, the solids content is about 94% by weight or greater and the water content is about 6% or less. Generally, there is a point at which the concentration of sugar is such that no workable binder solution can be obtained, and the sugar concentration should usually not exceed about 99% by weight.

In a preferred embodiment of the invention described in more detail below, a solution with about 98% sugars is found to give good results.

The particular selection of sugar or sugars in the binder is not considered essential to the invention, that is to say there is no one sugar that it is believed must be included for the binder to operate. Instead, the sugars may be selected from individual sugars and combinations of all edible monosaccharides and disaccharides to provide the binder properties described. The sugars may in particular be selected from the group consisting of maltose, saccharose, galactose, fructose and glucose, and mixtures thereof, and good results have been obtained in a specific embodiment of the invention, set out below in more detail, in which a preferred binder comprising a mixture of maltose and saccharose is used. Other components in trace amounts may also be included in the binder in accordance with the usual practice in this field, such as salts, preservatives, colourings and antioxidants.

A binder for use in the invention may be prepared by dissolving one or more sugars selected from the group consisting of maltose, saccharose, galactose, fructose and glucose in water to form an aqueous sugar solution, and heating the solution to evaporate water from the solution and concentrate the sugar or sugars therein, to form a binder which is liquid at elevated temperature and which sets when it has been cooled to room temperature. As more water is evaporated so the boiling temperature of the binder increases. Typical sugar solutions start to boil at about 100 degrees C. or a little higher and can then be heated until the water content has been reduced to a point at which the boiling temperature is above about 120 degrees C., preferably above about 130 degrees C., and most preferably about 135–145 degrees C. A solution of roughly equal amounts of maltose and saccharose can be boiled to a water content of approximately 2% at about 140 degrees C. to produce a specific, preferred binder for the invention.

The method of the invention is suitable for manufacture of snacks such as "granola" bars from ingredients such as nuts, fruit, dried fruit, cereals, and cereal products. Particularly good results have been obtained in a method comprising, at a temperature of 90 degrees C. or higher, mixing ingredients for the product with liquid binder to obtain a formable mixture, wherein the binder is a sugar solution with a solids content of about 98% by weight and is liquid at 90 degrees C. and sets when cooled to room temperature; then at 90 degrees C. or higher, whilst the binder is still liquid, forming the mixture into product precursor, and thereafter cooling the precursor to set the binder, thereby obtaining the snack-food product. The ingredients are preferably mixed at a temperature of 100 degrees C. or higher, though not so high as to risk caramelization or burning of the binder. The product precursors are preferably formed at 100 degrees C. or higher. The method of the invention is also suitable for manufacture of breakfast cereals such as those known and marketed as Cruesli, Harvest Crunch and 100% Natural (all registered trade marks in the UK and/or USA). In the case of breakfast cereals the mixture is typically formed into a product precursor that is a natural-shaped cluster of ingredients. For manufacture of products such as granola bars the product precursor is bar-shaped.

In an embodiment of the invention, a method is provided for manufacture of breakfast cereal, wherein hot mixture of ingredients plus binder is cut into cube-like, or at least substantially angular, pellets, the pellets are processed to give them a less angular and more rounded shape, and thereafter cooled into breakfast cereal. The cereal preferably comprises pellets with diameters in the range of 5 mm to 20 mm, more preferably in the range of 10 mm to 16 mm.

A further preferred step is for the outsides of the pellets to be coated with finely ground ingredients, these ingredients adhering to the outside of the pellets and giving them a non-glossy appearance. Pellets of desired size may be separated from pellets that are too large or too small by a sieving or other separation step in which product is separated from non-product, and this later non-product material can optionally be passed back to an earlier stage in the manufacturing process, such as into the stage where ingredients and binder are mixed. Thus, an advantage of the invention is that there is minimal or substantially no wastage of material, as non-product, or rework material can be recycled. A further advantage of the invention is that the process of cooling the product precursor into the cooled product is substantially reversible, and hence if necessary it would be possible for material that had, say, been moulded into cookies to be reheated and reworked so as to be passed into, say, the breakfast cereal product line, again without wastage or detriment to the product.

In a further embodiment of the invention, the method is for manufacture of snack bars, and the method comprises forming the heated mixture of ingredients plus binder into a sheet and cutting the sheet into snack bar forms, optionally via a combination of rotating knives and/or a guillotine. It is found in use of the embodiment of the invention that substantially no material is wasted, as the cutting process does not generate wasted fragments or other cuttings, and hence there is highly efficient use of the ingredients in producing the snack bars.

In a still further embodiment of the invention, the method is for manufacture of cookies, and comprises moulding heated ingredients plus binder into cookie shapes, cooling the moulds and thereafter releasing the cookies from the moulds. Again, this process is found in use to generate no wastage of material.

The products obtained generally have a reduced water availability to prevent microbial growth and lengthen shelf life. Such availability of water in the food is commonly termed "water activity" (A). In general, a low A of the food product (under 0.90) indicates the existence of an environment in which most bacteria will not generally grow, and 0.1–0.55 is preferred.

In a further aspect, the invention also provides a method of binding ingredients in a snack-food product, comprising obtaining, at elevated temperature, a liquid form of a binder, combining the ingredients with the liquid form of the binder to obtain a mixture of ingredients plus binder, moulding or otherwise forming the mixture or a portion of the mixture into one or more snack-food product precursors, and allowing the binder to cool to a reduced temperature, wherein the binder is in a liquid state at the elevated temperature and sets upon cooling to the reduced temperature, the binder being regarded as set when it is in a solid state which is substantially dry and non-sticky to the touch.

The binder is obtainable by heating an aqueous solution of one or more sugars to reduce the water content of the solution so that the binder is liquid at temperatures above about 100° C. and is set when at temperatures below about 60° C. More preferably, the binder is liquid at temperatures above about 90° C. and sets at temperatures below about 70° C. An additional optional step is to treat the product, post-cooling, with further ingredients that would be damaged by the elevated temperature used to mix the ingredients, such as by addition of a glaze or a chocolate coating to the product or to a part thereof.

A yet further aspect of the invention provides apparatus for making a granola or snack-food product, comprising:
  a mixing station, for mixing of a binder solution with ingredients for the product;
  a forming station, for forming of a mixture of ingredients plus binder into product precursors, said forming taking place at elevated temperature;
  means for transfer of the mixture from the mixing station to the forming station;
  a cooling station for cooling of product precursors formed in the forming station to a temperature at which the binder sets and product is obtained; and means for transfer of the formed product precursors from the forming station to the cooling station.

Mixing of the binder with the ingredients and subsequent forming of precursors preferably takes place at 100° C. or higher, and these are preferably then cooled to below 60° C. to obtain setting of the binder.

The invention thus advantageously provides apparatus with which a granola or snack-food product can be made without the need for an extended drying interval after combining of its component ingredients. The product can instead rapidly proceed to cooling and packaging. Unlike prior art apparatus, the invention avoids a drying oven that holds up the rest of the production line whilst large amounts of product precursors are being slowly dried to an acceptable water content.

In the apparatus of the invention, the mixing station is suitably for receipt, batch-wise or continuously, of liquid binder from binder preparation apparatus and for receipt of dried ingredients from ingredients preparation apparatus. Thus the process can be seamlessly integrated so that binder and ingredients are prepared separately and fed into the mixing station.

The binder preparation apparatus may include a binder blending station for blending of binder components, such as water and sugar, and a heating station for heating of the binder components to reduce its water content prior to delivery to the mixing station. Typically, if a high solids content sugar solution is to be used as binder this is not bought as such. Instead the raw ingredients, sugar and water, are combined in situ and processed, principally by heating, into the desired solution.

Similarly, the various ingredients are usually brought together on site and thus the ingredients preparation apparatus may comprise a dosing station, at which ingredients can be mixed with oil and other optional liquid components, and a baking station, at which the dosed ingredients can be baked prior to delivery to the mixing station. 10 parts by weight oat flakes or 5 parts by weight wheat flakes are preferably mixed with about 1 part by weight oil. Baking then imparts a nutty, flavour to the ingredients, adding a further attractive quality to the product.

In preferred embodiments of the invention, once the products have cooled at least enough for setting of the binder, they are ready for packaging and storage without further processing. It is hence possible to include in the apparatus a packing station and means for transfer of cooled snack-food product from the cooling station to the packing station.

The process of the invention is suitable for manufacture of a wide range of snack-food products that contain melting ingredients. Once the product has been formed, melting ingredients, including for example chocolate, can of course be applied to the cooled product, usually to the outside. The food items that can be made according to the process of the present invention include those containing nuts, fruit, dried fruit, cereal products and cereal flakes, and these preferably comprise a combination of oat flakes, wheat flakes, hazelnuts and coconut. They are typically breakfast cereals and hand-held snack-food items weighing from 10–200 g. Also typically they are non-baked and sweet in that they contain sugar. By the term sugar it is intended to include all mono- and di-saccharides used typically in the food industry. Preferred examples of such sugars include glucose, galactose, fructose, sucrose and maltose. The sugar may also be supplied in honey or other natural synthetic sources of sugar.

In a preferred embodiment of the invention, the ingredients for the snack-food product are treated so as to have approximately the moisture content that is desired to be obtained in the end product. Suitably, the ingredients are pre-treated by drying so as to reduce their moisture content to below about 3%. Typically, the moisture content of a snack-food product of the type that can be made by the process of the invention is about 2.5% moisture by weight or less, and usually close to about 2% moisture by weight. Pre-drying of the ingredients confers the additional advantage that once the ingredients have been bound together by the binder no further drying is required to place the product in a form that is suitable for immediate packing and storage and onward transmission, for example to customers. It can be seen that a highly advantageous component of the invention is that after the ingredients and binder have been combined and mixed and formed into the shape of the desired end-product, this can be cooled, allowing the binder to set, forming a product which requires no further processing or drying but can immediately be packaged.

In a specific embodiment of the invention, snack-food product ingredients are blended with a super-saturated sugar solution at a temperature that is at least 90 C. The mixture of ingredients and binder is thoroughly mixed and formed into the size and shape of the hand-held snack-food items desired as the end product of the process. These are allowed to cool and the binder has set once the temperature has reached below 70° C. At this stage, before the products have cooled completely to room temperature, the outsides of the products are found to be substantially dry and non-sticky and hence the products can be packaged even before they have completely cooled.

The invention hences also provides a method of manufacture of a granola or snack-food product, comprising use of a super-saturated sugar solution to bind ingredients for the product, wherein the super-saturated sugar solution and ingredients are mixed at elevated temperature, at which temperature the sugar solution is in liquid form, and wherein the resultant mixture of sugar solution plus ingredients is thereafter cooled into a product. The sugar solution is preferably selected so that after cooling no drying of the product is necessary before the product is in a state suitable for it to be packaged and/or otherwise processed. It is also preferred that the sugar solution is such that the process of cooling the mixture of sugar solution plus ingredients into a cooled product is essential reversible, so that cooled product can be re-heated and re-formed either into new product or different product without wastage or detriment to the eventual product.

Specific embodiments of the invention are now described in the following examples.

EXAMPLE 1

Treatment of Ingredients

Oat and wheat flakes typically have a moisture content of about 12% after rolling. Other components typically have moisture contents that are significantly greater than 2%.

Oat and wheat flakes and hazelnuts and coconut are pre-treated by baking in an oven so as to reduce their water content to the following approximate levels:

|  | Moisture Content |
| --- | --- |
| Oat and wheat flakes | 2% |
| Crisp rice | 2% |

-continued

|                  | Moisture Content |
|------------------|------------------|
| Chopped hazelnuts | 2%              |
| Coconut          | 2.3%             |

EXAMPLE 2

Preparation of Binder

A sugar solution is prepared by adding 190 g saccharose and 60 g water to 250 g maltose syrup, the maltose syrup being amylum glucomalt 853 (registered trade mark) with a moisture content of about 19%. These ingredients are heated and stirred and the temperature at which the solution started boiling is observed to be 108° C. Heating is continued, with a corresponding evaporation of water and a corresponding increase in the boiling temperature of the solution until the solution is boiling at 140° C., at which temperature the moisture content of the binder is about 2%.

The final composition of the sugar solution is 50.6% maltose syrup, 47.4% saccharose and 2% water. This solution is found to be processable at 100° C. and to start to solidify at around 85° C.

EXAMPLE 3

Manufacture of Snack-Food Product

Pre-treated ingredients from example 1 and the sugar-solution of example 2 are mixed at a temperature of about 100° C. and this temperature maintained whilst the mixture is formed into hand-held sized snack-food product precursors. These are then allowed to cool and it is observed the binder sets at about 85° C. and a few seconds thereafter the surface of each precursor is non-sticky and dry. It is possible to handle these precursors before they have cooled fully to room temperature.

The moisture content of the product is tested and found to be about 2% for all components, being an acceptable moisture content in the finished snack-food product. There is almost no wastage as no cutting or breaking or sieving steps are necessary using the process.

EXAMPLE 4

Manufacture of Cruesli (Registered Trade Mark) Type Breakfast Cereal

Pre-treated ingredients from example 1 are combined with the sugar-solution of example 2 at a temperature of about 105° C. and mixed in a twin screw mixer. Heated re-work material, that is to say material removed from the product during the manufacture process as surplus or excess, is optionally introduced into this mixing stage to avoid wastage.

The hot mixed ingredients are cut into cubes of approximately 11 mm×11 mm×11 mm as the ingredients exit the mixer. These cut particles are transferred to an enrober comprising a rotating cylinder to which ground material is also added. The particles are subjected to the rotating action of the cylinder, converting the cube-like particles into more rounded clusters of ingredients. On entry into the enrober the sugar solution gives the pellets a rather glossy appearance. In the enrober, the ground material, referred to as fines, sticks to the outside of the clusters so that this glossiness is substantially eliminated and so that the more rounded pellets exiting the enrober have a duller and less glossy finish.

On exiting the enrober, the rounded pellets are transferred to a sieving station, where pellets larger than 16 mm diameter or smaller than 10 mm diameter are sieved off and removed. Pellets larger than 16 mm diameter are past to a breaking station after which they are refed into the sieving station. Particles less than 10 mm diameter are passed to the grinding station where they are ground into fine material and added to the enrober. Surplus material less than 10 mm diameter, if there is any surplus, is passed as rework material to the initial mixing station, thus avoiding wastage.

Whilst the cutting diameters and sieving diameters have been specied above, these diameters are adjustable according to the needs of the product.

Breakfast cereal product exiting the sieving station are then cooled to about 20° C. above ambient and packaged.

EXAMPLE 5

Manufacture of Snack Bars

Ingredients from example 1 and the sugar-solution of example 2 are mixed in a twin screw mixer at about 105° C. and the mixture is formed into a sheet using forming rollers and a belt conveyor. The sheet is cut into ribbons using rotating knives and the ribbons subsequently or simultaneously cut into bars by a guillotine. The bars are cooled to about 20° C. above ambient and can thereafter be further processed and/or packaged.

It is found that there is substantially no wastage or breaking of product by the cutting by rotating knives and guillotine, and therefore no waste or rework material is produced.

EXAMPLE 6

Manufacture of Cookies

Using a twin screw mixer, the sugar-solution of example 2 and the ingredients of example 1 are thoroughly mixed at about 110° C. and the hot mixture of ingredients filled into moulds of cookie shape. The moulds are cooled down, to about 20° C. above ambient and the cookie products released from the moulds, for packaging and/or further processing and then packaging.

The present invention thus provides apparatus and method for manufacture of granola or snack-food products.

The invention claimed is:

1. A method of making a granola or snack-food product, comprising:
   a. at a temperature of about 90 degrees C. or higher, mixing dry mix ingredients for the granola or snack-food product with a fat-free liquid binder to obtain a formable mixture, wherein said liquid binder is a sugar solution consisting essentially of less than about 6% by weight water and at least about 94% by weight sugar, and wherein said binder is a liquid at about 90 degrees C. and sets when cooled to room temperature;
   b. at about 90 degrees C. or higher and while the binder is still liquid, cutting the mixture into a plurality of product precursors; and
   c. cooling the precursors to set the binder, thereby obtaining the granola or snack-food product.

2. The method of claim 1, wherein the binder sets when cooled below about 70° C.

3. The method of claim 1, wherein the binder sets when cooled below about 40° C.

4. The method of claim 1, wherein the binder is a sugar solution having a sugar concentration of about 98% by weight.

5. The method of claim 1, wherein the binder is a sugar solution having a sugar concentration of up to about 99%.

6. The method of claim 1, wherein the binder comprises at least one sugar selected from the group consisting of maltose, saccharose, galactose, fructose, and glucose.

7. The method of claim 1, comprising obtaining the binder by:
- dissolving a mixture of at least one sugar selected from the group consisting of maltose, saccharose, galactose, fructose, and glucose in water to form an aqueous sugar solution; and
- heating the aqueous sugar solution to evaluate water from the solution and concentrate the sugar or sugars therein;
- wherein a binder is obtained which is a liquid at an elevated temperature and which sets when cooled to room temperature.

8. The method of claim 1, wherein the ingredients for the product comprise at least one ingredient selected from the group consisting of nuts, fruit, cereals, and cereal products.

9. The method of claim 1, comprising mixing the ingredients at a temperature of about 100° C. or higher.

10. The method of claim 1, comprising forming the product precursors at about 100° C. or higher.

* * * * *